(No Model.)
G. W. BLAIR.
SHAFT SUPPORT.
No. 279,076.  Patented June 5, 1883.
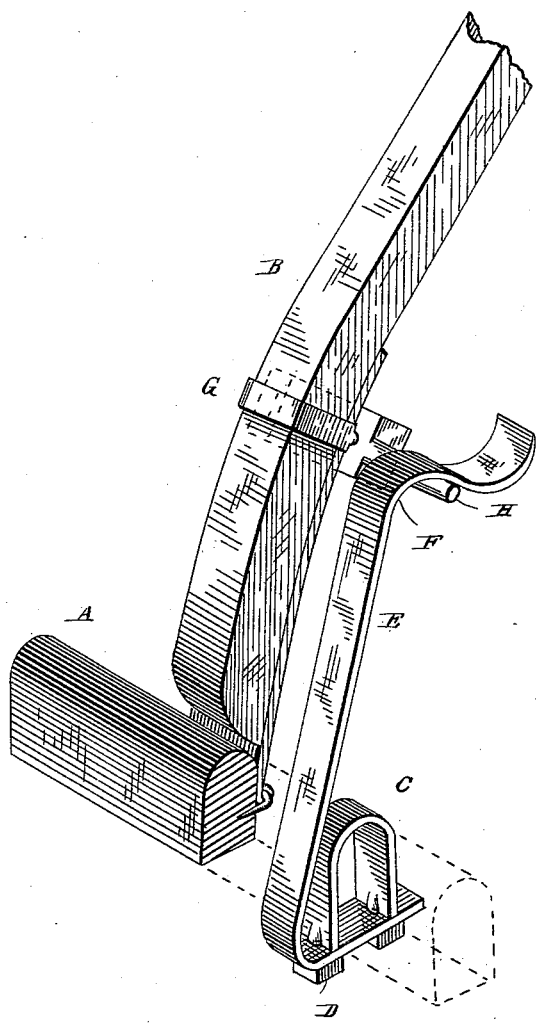
Witnesses.
Edwin L. Yewell
H. A. Taulmin
Inventor.
George W. Blair
E. M. Alexander
Attorney

UNITED STATES PATENT OFFICE.

GEORGE W. BLAIR, OF WABASH, INDIANA.

SHAFT-SUPPORT.

SPECIFICATION forming part of Letters Patent No. 279,076, dated June 5, 1883.

Application filed March 31, 1883. (No model.)

*To all whom it may concern:*

Be it known that I, GEORGE W. BLAIR, a citizen of the United States, residing at Wabash, in the county of Wabash and State of Indiana, have invented certain new and useful Improvements in Shaft-Supports, of which the following is a specification, reference being had therein to the accompanying drawings.

This invention has for its objects to provide certain means for automatically engaging the shafts of a vehicle and holding the same in an elevated position after the draft-animal has been released, as more fully hereinafter specified. These objects I attain by the means illustrated in the accompanying drawing, in which is represented a perspective view showing my invention.

In the said drawing, the letter A indicates the forward axle of a vehicle, and B the shafts, attached thereto in the usual manner. To the said axle, near one side, is securely fastened, by means of a clip, C, extending over the axle, and suitable screw-nuts, D, a flexible metallic leaf-spring, E, the end of which extends forward parallel or nearly parallel to one of the shafts. The forward end of the said spring is bent or curved downwardly in such manner as to have formed near its extremity a curved shoulder, F, for the purpose hereinafter described, the extremity of the spring being bent upward, as shown. To one of the shafts is secured by suitable bolts a clip, G, having a lateral pin or projection, H. The said clip is provided with suitable means whereby it may be fastened to the shaft, so that the pin or projection may extend inwardly in such manner as to be engaged and held by the shouldered portion of the spring, so as to keep the shafts in the required elevated position.

The operation of my invention will be readily understood in connection with the above description. When the shafts are raised and the animal released, the pin or projection H passes under the curved end of the spring, raising said spring until the shoulder falls over the pin or projection, so as to engage the same and hold the shafts in a properly elevated position.

I am aware that springs have heretofore been used for shafts which will clamp the same and hold them in an upright position, and such I do not claim, broadly.

Having thus described my invention, what I claim, and desire to secure by Letters Patent, is—

The combination, with the axle A, of the shaft B, the clip G, and lateral projection H, of the bent spring E, having a curved shoulder, F, adapted to set over and hold the projection, and the clips C and nuts D, for holding the spring E to the shaft, substantially as and for the purpose specified.

In testimony whereof I affix my signature in presence of two witnesses.

GEO. W. BLAIR.

Witnesses:
 WILLIAM D. ALEXANDER,
 CHAS. D. DAVIS.